(12) United States Patent (10) Patent No.: US 8,740,074 B2
Yamazaki et al. (45) Date of Patent: Jun. 3, 2014

(54) IMAGING APPARATUS FOR READING INFORMATION

(75) Inventors: Kozo Yamazaki, Inagi (JP); Isao Iwaguchi, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 555 days.

(21) Appl. No.: 12/568,047

(22) Filed: Sep. 28, 2009

(65) Prior Publication Data

US 2010/0079826 A1     Apr. 1, 2010

(30) Foreign Application Priority Data

Sep. 30, 2008   (JP) ................................ 2008-254856

(51) Int. Cl.
*G06K 19/00*     (2006.01)

(52) U.S. Cl.
USPC ............................. 235/454; 235/435; 235/439

(58) Field of Classification Search
USPC .................................. 235/435, 439, 454, 462
See application file for complete search history.

(56) References Cited

U.S. PATENT DOCUMENTS

| | | | |
|---|---|---|---|
| 5,063,450 A | 11/1991 | Pritchard | |
| 5,473,149 A * | 12/1995 | Miwa et al. | 235/462.41 |
| 5,541,779 A | 7/1996 | Choi | |
| 5,959,776 A | 9/1999 | Pasch | |
| 5,978,021 A | 11/1999 | Kim | |
| 2004/0008339 A1 | 1/2004 | Koishi et al. | |
| 2006/0018647 A1 | 1/2006 | Iwanaga | |
| 2006/0127072 A1 | 6/2006 | Seo | |
| 2006/0215248 A1 | 9/2006 | Maram et al. | |
| 2008/0012969 A1 | 1/2008 | Kasai et al. | |
| 2008/0037085 A1 * | 2/2008 | Gabor et al. | 359/24 |

FOREIGN PATENT DOCUMENTS

| | | |
|---|---|---|
| CN | 1116720 A | 2/1996 |
| EP | 1 564 987 | 2/2005 |
| JP | 60-029722 | 2/1985 |
| JP | 06-022207 | 1/1994 |
| JP | A 6-70225 | 3/1994 |
| JP | 08-114769 | 5/1996 |
| JP | 08-242403 | 9/1996 |
| JP | A 9-51484 | 2/1997 |
| JP | 09-083858 | 3/1997 |
| JP | 10-178578 | 6/1998 |
| JP | B2 3150502 | 3/2001 |
| JP | 2003-050991 | 2/2003 |

(Continued)

OTHER PUBLICATIONS

Notice of Rejection issued by the Japanese Patent Office in corresponding Japanese Application No. 2008-254856, dated Nov. 22, 2011.

(Continued)

*Primary Examiner* — Michael G Lee
*Assistant Examiner* — Matthew Mikels
(74) *Attorney, Agent, or Firm* — Greer Burns & Crain Ltd.

(57) ABSTRACT

A liquid crystal panel includes an iris unit for limiting the incident range of light from an object to be shot, and a filter unit for assigning a exposure energy distribution varying with the position to incident light whose incident range is limited by the iris unit. The control unit controls the ON time and the OFF time of each pixel of the liquid crystal panel, and then a low pass filter operation on the captured image as an image processing can be optically replaced.

7 Claims, 19 Drawing Sheets

(56) References Cited

FOREIGN PATENT DOCUMENTS

| | | |
|---|---|---|
| JP | A 2004-48266 | 2/2004 |
| JP | 2005-266096 | 9/2005 |
| JP | A 2006-171286 | 6/2006 |
| JP | 2007-081544 | 3/2007 |
| JP | A 2007-97049 | 4/2007 |
| JP | A 2007-102062 | 4/2007 |
| JP | 2007-166155 | 6/2007 |
| JP | 2007-306447 | 11/2007 |
| JP | 2008-035241 | 2/2008 |
| JP | 2008-225158 | 9/2008 |
| KR | 10-2004-0033964 | 4/2004 |
| WO | WO 2008/079187 | 7/2008 |

OTHER PUBLICATIONS

Office Action issued by the Korean Intellectual Property Office mailed Dec. 30, 2010, for corresponding Korean Patent Application No. 10-2009-91588.

Office Action issued by the Korean Intellectual Property Office mailed Jan. 20, 2011, for corresponding Korean Patent Application No. 10-2009-91586.

Notice of Rejection Grounds dated Jan. 31, 2012 issued by the Japanese Patent Office in corresponding Japanese Application No. 2008-254850.

Office Action issued by the Chinese Patent Office in co-pending Chinese Patent Application No. 200910177188.6, mailed May 19, 2011.

Office action issued in U.S. Appl. No. 12/568,117, mailed Jun. 18, 2012.

Notice of Rejection Ground mailed Nov. 6, 2012 issued by the Japanese Patent Office in corresponding Japanese Patent Application No. 2008-254850 (with partial English translation).

Extended EP Search Report issued in EP App. No. 09 17 1512.8, mailed Jul. 17, 2013.

Extended EP Search Report issued in EP App. No. 09 17 1519.3, mailed Jul. 17, 2013.

* cited by examiner

F I G. 4 A
F I G. 4 B

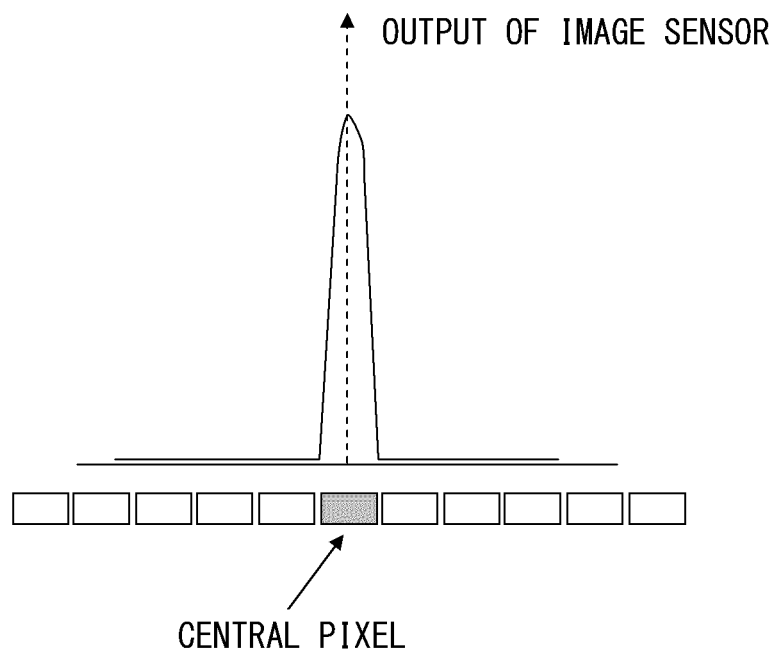
F I G. 5

|     | a-2 | a-1   | a    | a+1   | a+2 |
|-----|-----|-------|------|-------|-----|
| b+2 | 0   | 0     | 0    | 0     | 0   |
| b+1 | 0   | 0.063 | 0.125| 0.063 | 0   |
| b   | 0   | 0.125 | 0.25 | 0.125 | 0   |
| b-1 | 0   | 0.063 | 0.125| 0.063 | 0   |
| b-2 | 0   | 0     | 0    | 0     | 0   |

$Q(a,b) = 0.063*P(a-1,b+1) + 0.125*P(a,b+1) + 0.063*P(a+1,b+1)$
$\qquad + 0.125*P(a-1,b) + 0.25*P(a,b) + 0.125*P(a+1,b)$
$\qquad + 0.063*P(a-1,b-1) + 0.125*P(a,b-1) + 0.063*P(a+1,b-1)$ WHERE P INDICATES VALUE OF ACQUIRED IMAGE,
AND Q INDICATES OUTPUT AFTER OPERATION

FIG. 6A

|     | a-2 | a-1   | a     | a+1   | a+2 |
|-----|-----|-------|-------|-------|-----|
| b+2 | 0   | 0     | 0     | 0     | 0   |
| b+1 | 0   | 0.111 | 0.111 | 0.111 | 0   |
| b   | 0   | 0.111 | 0.111 | 0.111 | 0   |
| b-1 | 0   | 0.111 | 0.111 | 0.111 | 0   |
| b-2 | 0   | 0     | 0     | 0     | 0   |

FIG. 6B

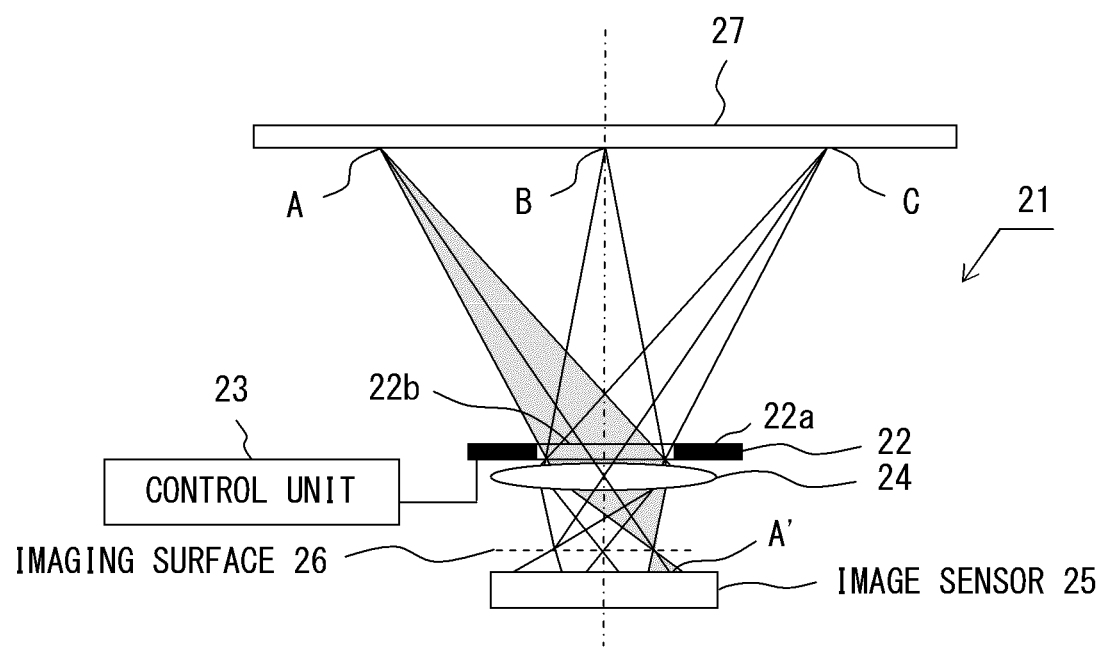
F I G. 7

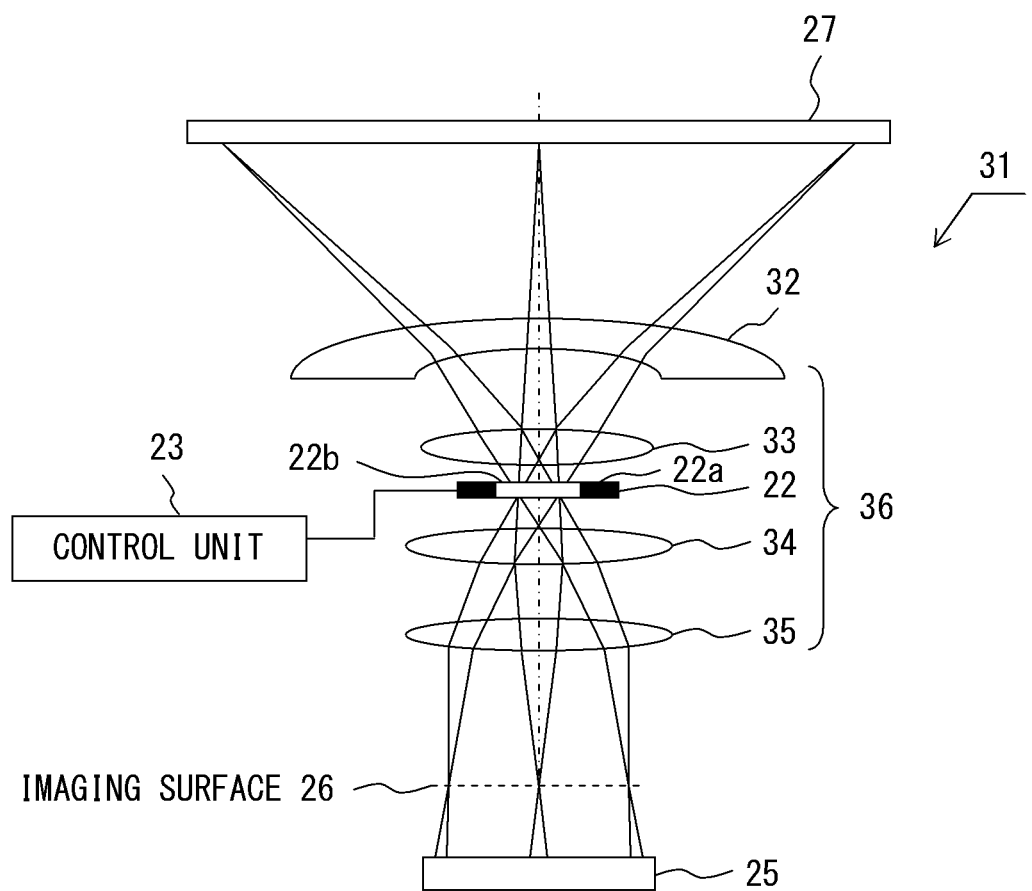
F I G. 8

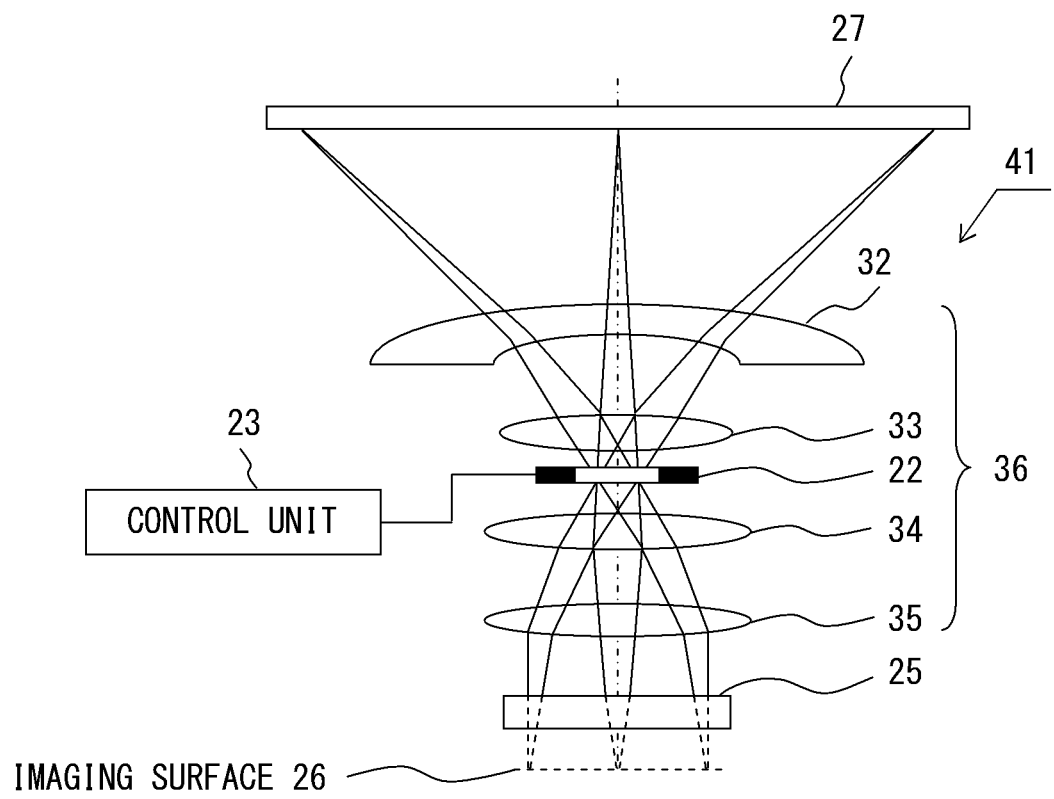
F I G. 9

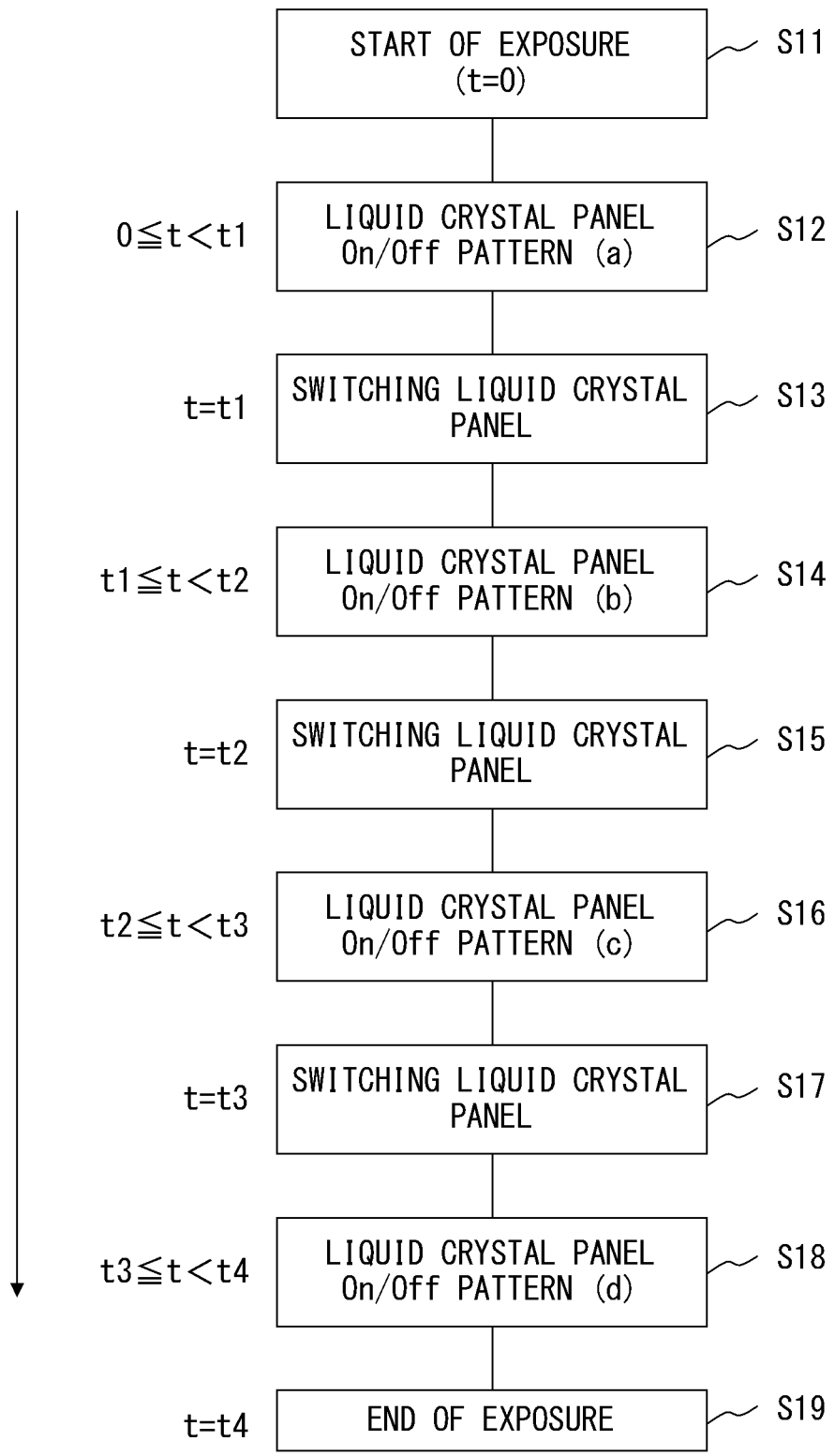
F I G. 1 1

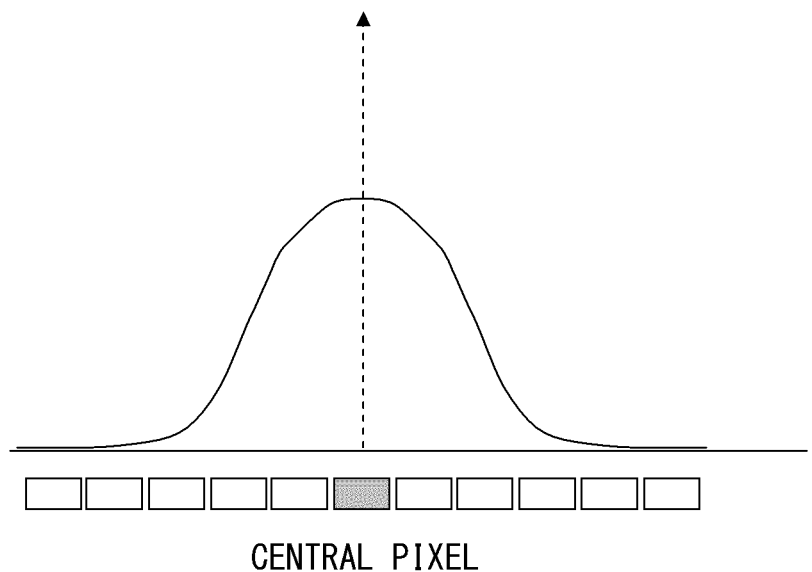
F I G. 1 2

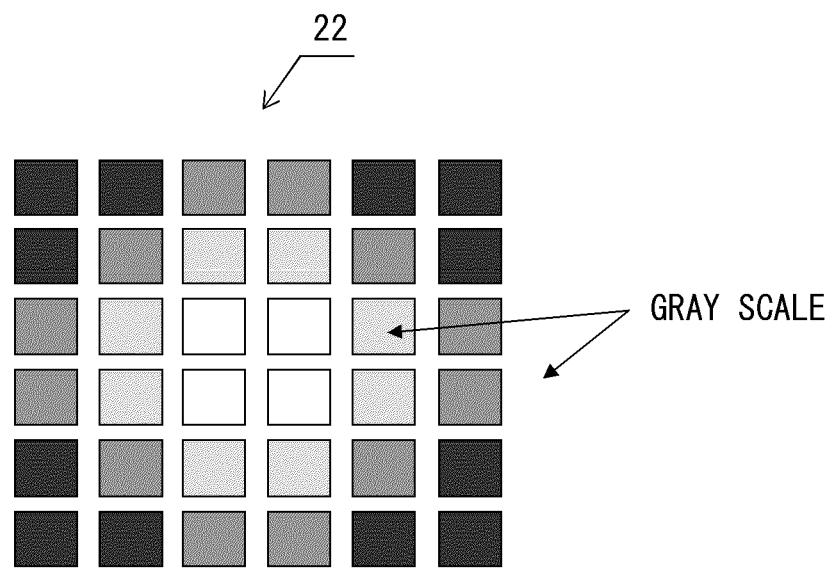
F I G. 1 3

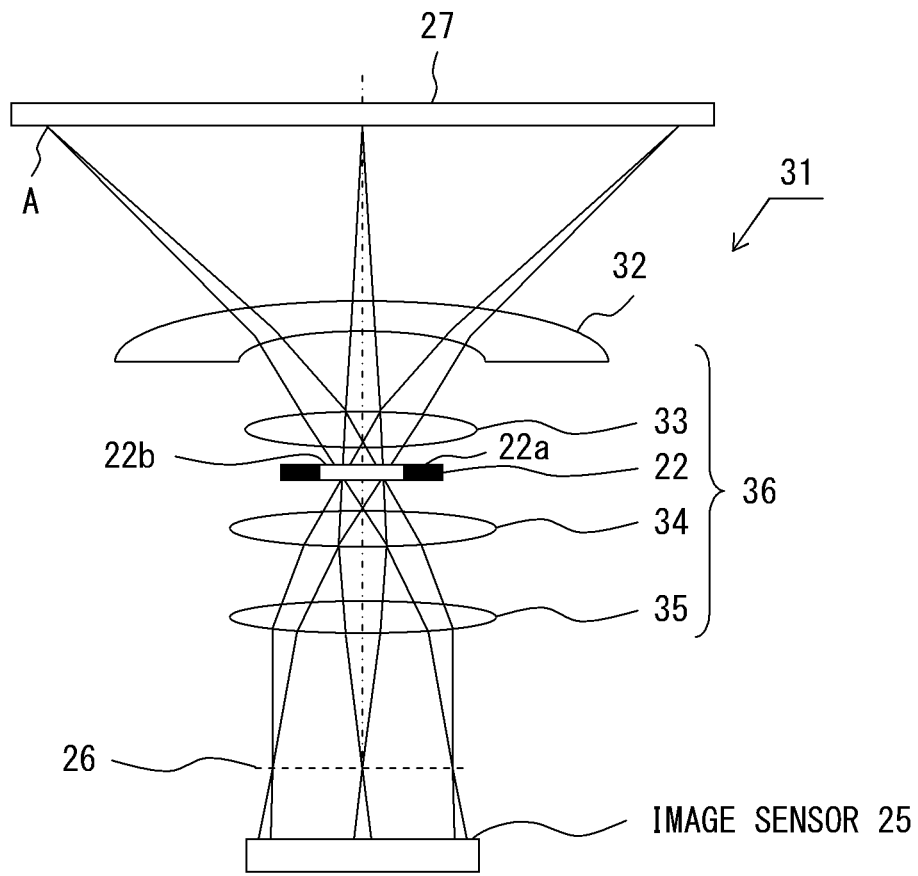
F I G. 14A
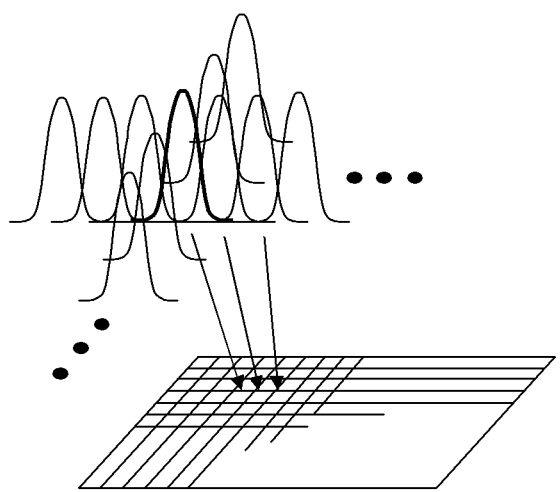
F I G. 14B

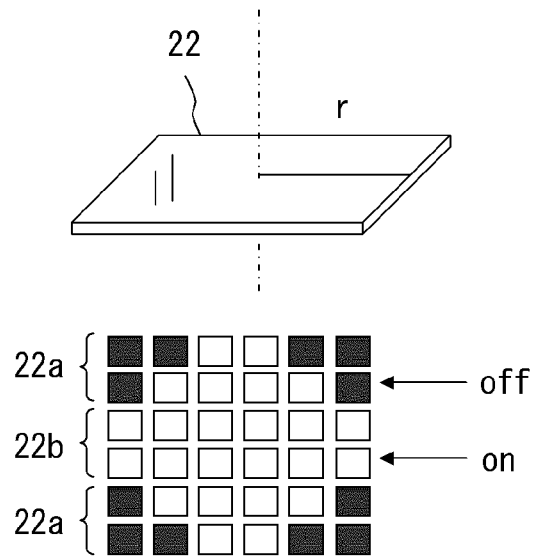
F I G. 1 6 A
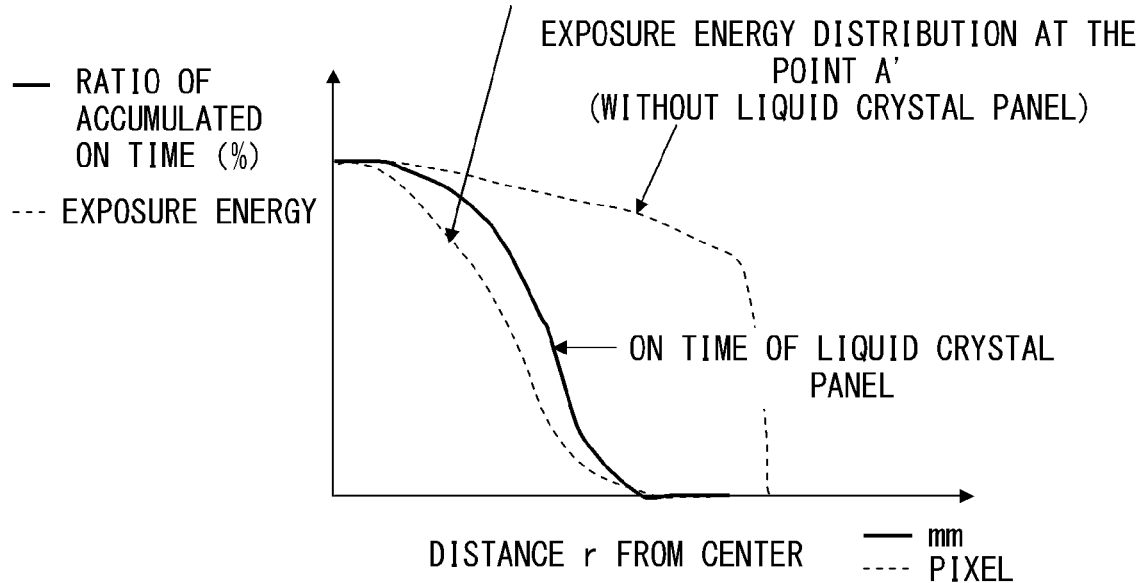
F I G. 1 6 B

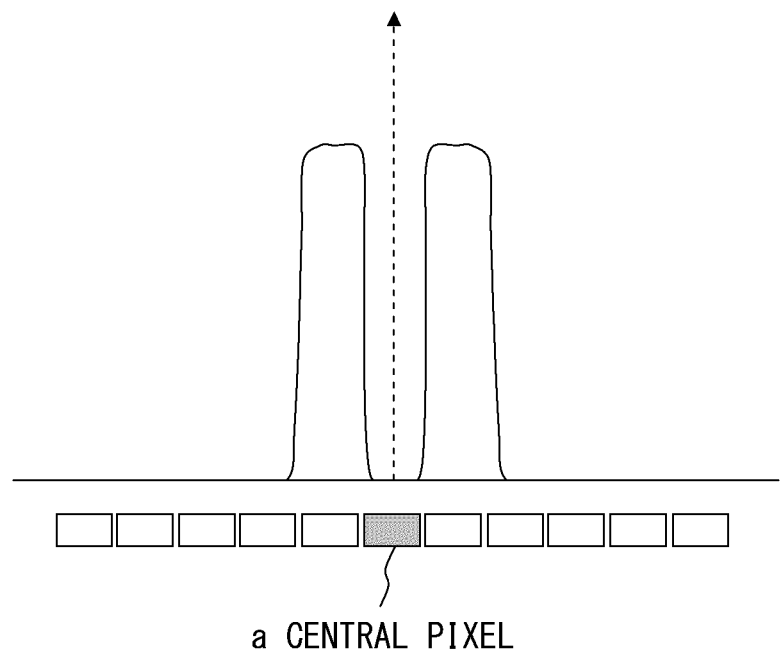
F I G. 1 8

|     | a−2 | a−1   | a     | a+1   | a+2 |
|-----|-----|-------|-------|-------|-----|
| b+2 | 0   | 0     | 0     | 0     | 0   |
| b+1 | 0   | 0.125 | 0.125 | 0.125 | 0   |
| b   | 0   | 0.125 | 0     | 0.125 | 0   |
| b−1 | 0   | 0.125 | 0.125 | 0.125 | 0   |
| b−2 | 0   | 0     | 0     | 0     | 0   |

IMAGING APPARATUS FOR READING INFORMATION

FIELD OF THE INVENTION

The present invention relates to an imaging apparatus for reading information from an object.

DESCRIPTION OF THE RELATED ART

An imaging apparatus is used to read information printed on a medium such as a paper sheet, or information on a live body. FIGS. 1 and 2 illustrate the configurations of the optical system of an imaging apparatus 11 for reading information, such as a bar code printed on a paper sheet etc.

As illustrated in FIGS. 1 and 2, the imaging apparatus 11 has an iris 12, a lens 13 (or a lens module 16), and an image sensor 14.

The optical path of the light reflected by an object to be shot 15 is limited by the iris 12, and the light is received by the image sensor 14 through the lens 13.

When the information printed on a medium is read by the imaging apparatus 11, the distance between the lens 13 and the image sensor 14 is adjusted, so that the image forming surface is matched to the surface of the image sensor 14, thereby acquiring a clear image.

However, while a clear image has a large information volume, a change of a signal by the coarseness of the surface of a medium is superposed as noise on an original image signal.

FIGS. 3A and 3B are examples of the object to be shot 15. When a pattern printed on a paper sheet etc. as illustrated in FIG. 3A is read by the imaging apparatus 11, a change of a signal by coarseness of the paper surface can get on an original image signal as noise.

When the vein inside the palm of a hand as illustrated in FIG. 3B is read, the scattered light from the organization of the living body around the vein also gets on the original image signal as noise. Therefore, it is necessary to remove noise by performing an operation for low pass filter (LPF) processing etc.

FIG. 4A illustrates an image signal of an arbitrary line (for example, a line A illustrated in FIG. 3A) of an object to be shot, on which the noise is superposed. FIG. 4B illustrates an image signal after the noise is removed by low pass filter (LPF) processing.

FIG. 5 illustrates the output of the image sensor 14 of a conventional imaging apparatus. FIG. 5 illustrates the distribution of a level of an output signal of the point image on the image sensor 14 corresponding to an arbitrary point on an object to be shot, and the image forming surface matches the sensor surface to obtain a clear image. Therefore, the distribution of the level of an output signal indicates a waveform of the substantial concentration on one pixel (central pixel).

As described above, the clearer an image obtained by the imaging apparatus 11 is, the higher frequency noise gets on an image signal by the coarseness of the surface of a medium.

To solve the problem, conventional techniques perform an operation of low pass filter processing on an image signal output from the image sensor 14 to remove the high frequency noise.

FIGS. 6A and 6B illustrate the operation matrix of a Gaussian filter and a moving average filter used in the low pass filter processing.

The 3×3 operation matrix illustrated in FIG. 6A is described below. The target pixel Q (a, b) is calculated as a sum of a value obtained by multiplying the upper left pixel data P (a−1, b+1) by "0.063", a value obtained by multiplying the upper pixel data P (a, b+1) by "0.125", a value obtained by multiplying the upper right pixel data P (a+1, b+1) by "0.063", a value obtained by multiplying the left adjacent pixel data P (a−1, b) by "0.125", a value obtained by multiplying the pixel data P (a, b) by "0.25", a value obtained by multiplying the right adjacent pixel data P (a+1, b) by "0.125", a value obtained by multiplying the lower left pixel data P (a−1, b−1) by "0.063", a value obtained by multiplying the lower pixel data P (a, b−1) by "0.125", a value obtained by multiplying the lower right pixel data P (a+1, b−1) by "0.063".

An image signal treated by the Gaussian filter processing can be obtained by performing the above-mentioned operation on each pixel.

Similarly, the operation matrix illustrated in FIG. 6B is performed, that is, an image signal treated by the moving average filter processing can be obtained by multiplying a target pixel and its peripheral pixels by the value of the operation matrix illustrated in FIG. 6B.

However, it is necessary to perform the operation for the number of elements of the operation matrix (for example, nine times for the 3×3 matrix) on all pixels read by the imaging apparatus in the low pass filter processing using the above-mentioned operation matrix. When there are a large number of pixels, the processing time of image processing becomes long.

The patent document 1 describes providing a filter device having variable optical transmittance in front of a CCD image pickup element and controlling the filter device depending on the level of image light irradiated on the imaging surface of the CCD image pickup element. A transmissive liquid crystal panel is used as a filter device.

The patent document 2 describes removing an influence of a high intensity portion of an object to be shot by providing a filter panel having a large number of optical transmittance controllable filter elements in front of the photoreactive element of an electronic camera and reducing the optical transmittance of a filter element of any portion of the filter panel. The filter panel is configured by a number of liquid crystal display elements.

The patent document 3 describes dividing one screen of incident light into n divisions, magnifying each division of the divided light by n and converting the magnified light into an electric signal by the CCD, and reconstructing the converted signal into a signal of one screen.

Although the patent document 2 describes partially changing the optical transmittance of a liquid crystal display element, it aims at preventing the CCD image pickup element from being saturated by a high intensity portion of an object to be shot.

[Patent Document 1] Japanese Laid-open Patent Publication No. 6-70225

[Patent Document 2] Japanese Laid-open Patent Publication No. 9-51484

[Patent Document 3] Japanese Patent Publication No. 3150502

SUMMARY OF THE INVENTION

The present invention aims at providing a desired filtering process on an image and thereby shortening the processing time of image processing by an imaging apparatus for reading information.

The imaging apparatus for reading information according to the present invention includes: a transmissive spatial light modulator for assigning a specific exposure energy distribution varying with a position to incident light whose incident range is limited by an iris; a control unit for controlling the transmittance characteristic of the transmissive spatial light modulator; a lens; and an image sensor, and therein the distance between the lens and the image sensor is adjusted so that the image forming position of the lens can be set in front of or behind the light-receptive surface of the image sensor, and allows the transmissive spatial light modulator to make the light assigned the position-dependent exposure energy distribution characteristic to be spread within a predetermined range on the light-receptive surface.

The imaging apparatus for reading information can shorten the processing time of the image processing, and optically provide a desired low pass filter process on an image.

BRIEF DESCRIPTION OF THE DRAWINGS

FIGS. 4A and 4B illustrate an image signal on which noise is superposed and an image signal after LPF processing;

FIG. 5 illustrates the output of the image sensor of a conventional imaging apparatus;

FIGS. 6A and 6B illustrate an operation matrix of a Gaussian filter and a moving average filter;

FIG. 7 illustrates a configuration of the imaging apparatus according to the first embodiment of the present invention;

FIG. 8 illustrates a configuration of the imaging apparatus according to the second embodiment of the present invention;

FIG. 9 illustrates a configuration of the imaging apparatus according to the third embodiment of the present invention;

FIG. 11 is a flowchart of the ON/OFF control process of a liquid crystal panel;

FIG. 12 illustrates an exposure energy distribution around a target pixel on an image sensor;

FIG. 13 illustrates a drive state of a liquid crystal panel when a gray scale control is performed;

FIGS. 14A and 14B are explanatory views of the operations according to an embodiment of the present invention;

FIGS. 16A and 16B illustrate the ON time distribution of a liquid crystal panel and the energy distribution on an image sensor;

FIG. 18 illustrates the exposure energy distribution on an image sensor; and

FIG. 19 illustrates an operation matrix of a singular point removal filter.

DESCRIPTION OF THE PREFERRED EMBODIMENTS

Figure 1:
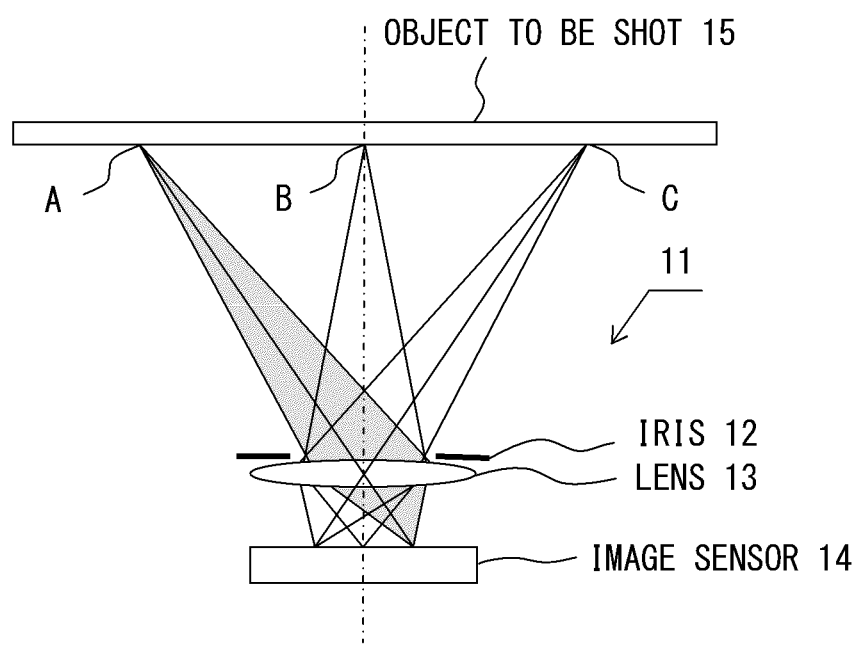
FIG. 1 illustrates a configuration of an imaging optical system.
Figure 2:
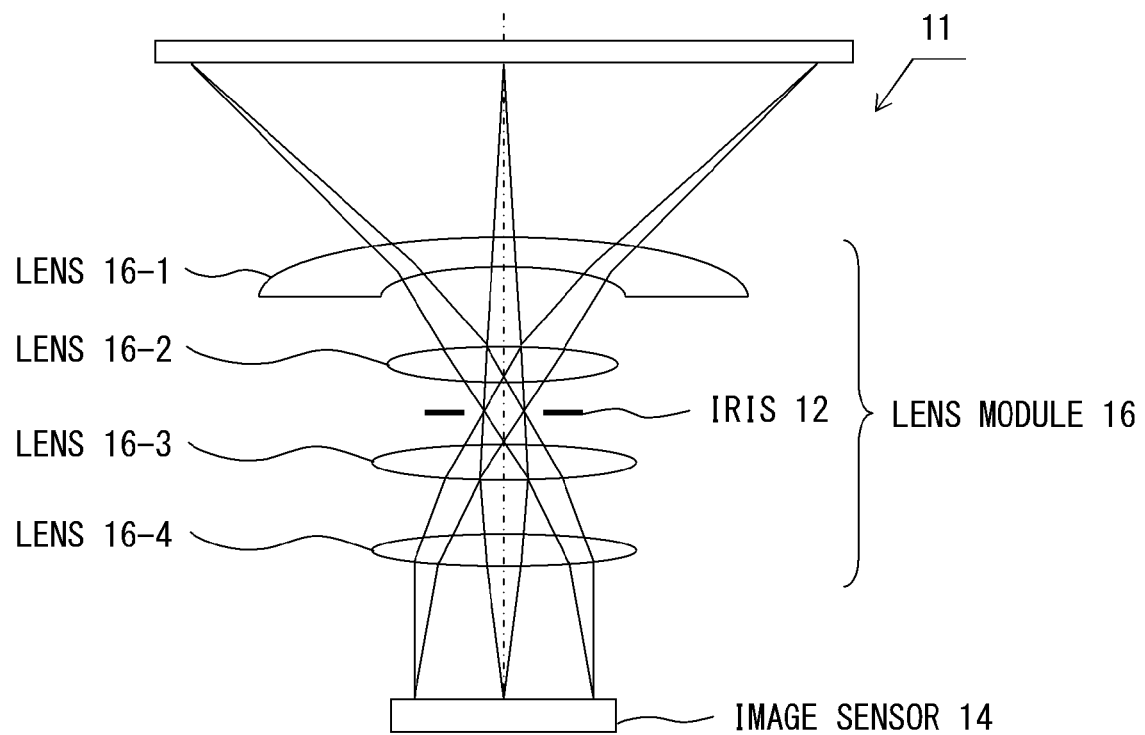
FIG. 2 illustrates another configuration of an imaging optical system.
Figure 3A:
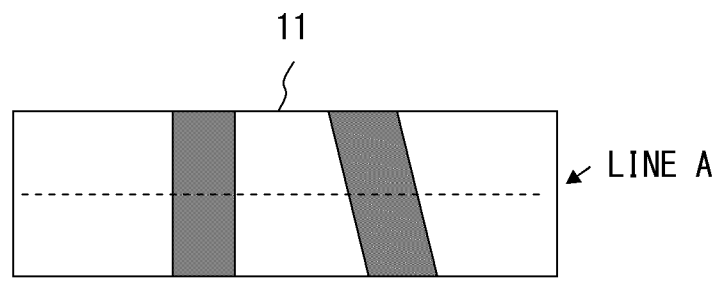
FIGS. 3A and 3B are examples of an object to be shot.
Figure 3B:
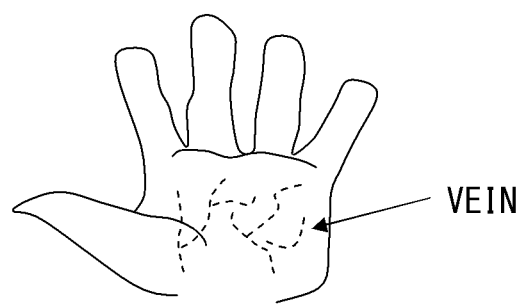

The preferred embodiments of the present invention are described below. FIG. 7 illustrates a configuration of an imaging apparatus 21 for reading information according to the first embodiment of the present invention. The imaging apparatus for reading information according to each embodiment of the present invention described below can be used in a bar code reader for reading a 1- or 2-dimensional bar code, a living body authentication device for reading a fingerprint or a vein, etc.

An imaging apparatus 21 for reading information includes a transmissive liquid crystal panel (transmissive liquid crystal device) 22, a control unit 23 for controlling the ON time and the OFF time of each pixel of the liquid crystal panel 22, a lens 24, and an image sensor 25. The transmissive liquid crystal panel 22 is used as a transmissive spatial light modulator (SLM).

The transmissive liquid crystal panel (hereinafter referred to as a liquid crystal panel) 22 includes an iris unit 22a for limiting the incident range of the light from an object to be shot 27, and a filter unit 22b for assigning a specific exposure energy characteristic depending on the position to the incident light whose incident range is limited by the iris unit 22a.

The iris unit 22a can cut off the light by placing the peripheral pixels of the liquid crystal panel 22 in the OFF state, or cover the periphery of the liquid crystal panel 22 with a cutoff plate of metal or resin etc. The iris unit 22a can be separate from the liquid crystal panel 22, and the liquid crystal panel 22 can be inserted into the aperture of the iris.

The control unit 23 is configured by a CPU etc., and controls the ON time and the OFF time of each pixel (liquid crystal display element) of the liquid crystal panel 22, thereby realizing an optical filter having a transmittance characteristic varying with the position.

The image sensor 25 is arranged so that its light-receptive surface can be set behind (as viewed from the lens 24) an imaging surface (image forming position) 26 of the lens 24.

In FIG. 7, the light from the object to be shot 27 enters the liquid crystal panel 22 while spreading. The range of the light scattered at each point of the object to be shot 27 (hereinafter referred to as a luminous flux) incidents on the lens 24 is limited by the iris unit 22a. When the light whose incident range is limited by the iris unit 22a passes through the filter unit 22b, the filter unit 22b assigns a specific exposure energy characteristic depending on the position to the incident light. Therefore, the exposure energy of the light continuously changes by a desired characteristic (for example, a Gaussian distribution) from the center of the luminous flux toward outside.

The luminous flux spreads toward the light-receptive surface of the image sensor 25 after an image is formed on the imaging surface 26, and the image has spread within a predetermined range on the light-receptive surface because the distance between the lens 24 and the image sensor 25 is adjusted so that the imaging surface 26 can be set behind (or in front of) the light-receptive surface of the image sensor 25. Here, the image on the light-receptive surface of the image sensor 25 spreads over a plurality of pixels, for example, spreads three pixels in diameter.

This spread size of the image corresponds to the operational matrix size of the low pass filter, for example, the operation of a 3×3 Gaussian filter illustrated in FIG. 6A can be substituted by the above-mentioned light power distribution of three pixels in diameter. Here, 3 pixels in diameter can substitute for a 3×3 circular symmetric operation matrix, such as a Gaussian filter. However, in order to substitute for any kind of 3×3 operation matrix, including circular asymmetric matrix such as a moving average operation matrix, 4.5 pixels in diameter which is the circumscribed circle diameter is preferable. A combination of light spread to the circumscribed circle and a variable transmittance filter using SLM can substitute for any kind of 3×3 operation matrix. In the same manner, when a large size LPF operation of 7×7 or 9×9 is substituted, the size of light power distribution should be 7 or 9 pixels in diameter, and preferably 10 or 13 pixels in diameter which is the circumscribed circle diameter of the matrix of 7×7 or 9×9 respectively.

In the above-mentioned first embodiment, the liquid crystal panel 22 can have an exposure energy characteristic varying with the position by controlling the ON time and the OFF time of each pixel of the liquid crystal panel 22. Then, by adjusting the imaging surface 26 of the lens 24 to be set behind (or in front of) the light-receptive surface of the image sensor 25, the output characteristic of each pixel of the image sensor 25 can have a desired radiant exposure distribution with each pixel centered. That is, by setting the transmittance characteristic of the liquid crystal panel 22 as the low pass filter characteristic, a low pass filter process can be optically performed on the output signal of the image sensor 25.

Therefore, since it is not necessary to perform a low pass filter operation on the output signal of the image sensor 25 as in the conventional system, the processing time of the image processing can be considerably shortened. Since the image processing time can be shortened, a less expensive CPU of a relatively low processing speed can be used for a bar code reader and a living body authentication device requiring a real-time process. Thus, the cost of the apparatus can be reduced.

In addition, by changing the ON time and the OFF time of each pixel element on the liquid crystal panel 22, or by performing gray scale control, the transmittance characteristic can be changed and any low pass filter characteristic can be obtained.

Since the filter characteristic of the liquid crystal panel 22 can be controlled in real time according to the first embodiment, a low pass filter process having a different characteristic can be performed for each captured image in a repetitive shooting of the object to be shot 27, and thereby higher precision signal processing can be realized. Otherwise, an image processed by a moving average filter can be acquired by placing all pixels of the liquid crystal panel 22 in the ON state.

FIG. 8 illustrates a configuration of an imaging apparatus 31 for reading information according to the second embodiment of the present invention. The second embodiment is an example of the image-side telecentric optical system in which the light from the lens toward the image sensor 25 is parallel to the optical axis, and the imaging surface 26 is set in front of (upward in the perpendicular direction of the image sensor 25 in FIG. 8) the image sensor 25.

The optical system of the imaging apparatus 31 for reading information according to the second embodiment has a lens module 36 configured by lenses 32, 33, 34, and 35, and the liquid crystal panel 22.

The imaging apparatus 31 for reading information according to the second embodiment is the same as that according to the first embodiment except that the optical system is configured by a plurality of lenses, and that the light incident to the image sensor 25 is parallel to the optical axis.

The imaging apparatus 31 for reading information according to the second embodiment is also configured by arranging the image sensor 25 so that the imaging surface 26 of the lens 35 can be set in front of (upward in the perpendicular direction of the image sensor 25 in FIG. 8) the light-receptive surface of the image sensor 25. Thus, the reflected light at each point of the object to be shot 27 spreads in a constant range on the light-receptive surface of the image sensor 25, and the power of incident light at each pixel of the image sensor 25 is limited by the transmittance characteristic of the liquid crystal panel 22.

According to the second embodiment as with the first embodiment, the low pass filter process can be optically performed on the light from the object to be shot 27 by controlling the ON time and the OFF time of each pixel of the liquid crystal panel 22. Therefore, since it is not necessary to perform the low pass filter operation on the output signal of the image sensor 25, the processing time of the image processing can be shortened. In addition, the low pass filter of any characteristic can be optically realized by changing the transmittance characteristic by changing the ON time and the OFF time of each pixel of the liquid crystal panel 22.

Since the optical system is image-side telecentric in the second embodiment, the size of an output image of the image sensor 25 is not changed when the spread of an image on the image sensor 25 is adjusted by changing the distance between the lens 35 and the image sensor 25, that is, when the size of the low pass filter (the noise removal level) is adjusted. Therefore, the size of the low pass filter can be adjusted independently from the image size.

FIG. 9 illustrates a configuration of an imaging apparatus 41 for reading information according to the third embodiment of the present invention.

The third embodiment is basically the same as the second embodiment except that the imaging surface 26 is set behind (as viewed from the lens 35) the image sensor 25.

Since the low pass filter process can be optically performed on the incident light to the image sensor 25 according to the third embodiment as with the second embodiment described above, the low pass filter process is not required, and the time taken for the image processing can be shortened.

Figure 10:
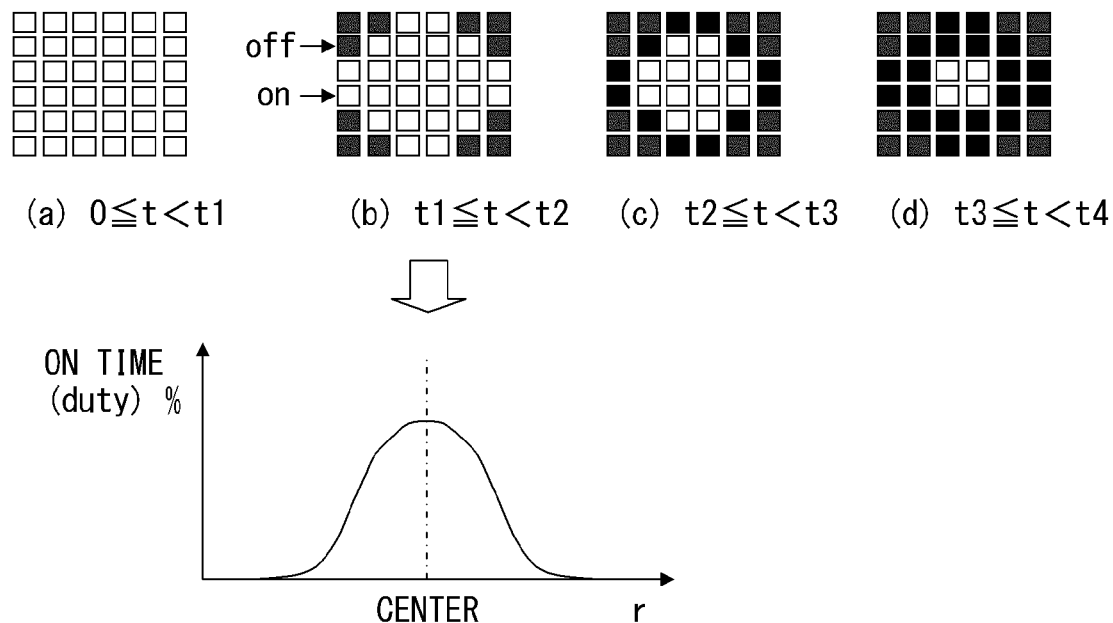
FIG. 10 illustrates an ON/OFF pattern and an ON time distribution of a liquid crystal panel.

FIG. 10 illustrates an ON/OFF pattern when the ON time and the OFF time of each pixel of the liquid crystal panel 22 is controlled and the distribution of the ratio of accumulated ON time to the total exposure time. Described is an example of the case where the liquid crystal panel 22 has 6×6 pixels.

In this example, four types of ON/OFF patterns are defined to set the transmittance characteristic of the liquid crystal panel 22 as the Gaussian distribution.

The ON/OFF pattern (a) in FIG. 10 is a drive pattern for placing all pixels in the ON state. In the ON/OFF pattern (a), the liquid crystal panel 22 is driven for the time $0 \leq t < t1$. The time t1 is, for example, ⅙ of the total exposure time.

The ON/OFF pattern (b) is a drive pattern for placing the pixels at four corner portions in the OFF state and the pixels at the central portion in the ON state. In the ON/OFF pattern (b), the liquid crystal panel 22 is driven for time $t1 \leq t < t2$. The time t2 is, for example, ⅗ of the total exposure time.

The ON/OFF pattern (c) is a drive pattern for furthermore placing the peripheral pixels in the OFF state than the ON/OFF pattern (b). In the ON/OFF pattern (c), the liquid crystal panel 22 is driven for time $t2 \leq t < t3$. The time t3 is, for example, ⅚ of the total exposure time.

The ON/OFF pattern (d) is a drive pattern for placing the four central pixels in the ON state and the other pixels in the OFF state. In the ON/OFF pattern (d), the liquid crystal panel 22 is driven for time $t3 \leq t < t4$.

By driving the liquid crystal panel 22 in the above-mentioned ON/OFF patterns for a predetermined time, the characteristic of the ratio of the accumulated ON time to the total exposure time having the Gaussian distribution profile as illustrated in FIG. 10 can be obtained. The vertical axis in FIG. 10 indicates the ratio of the accumulated ON time of each pixel to the total exposure time, and since this is Gaussian distribution, the ON time of the central pixel of the liquid crystal panel 22 is 100%.

FIG. 10 is an example of the ON/OFF pattern of the liquid crystal panel 22, and the pattern for controlling the ON time and the OFF time of the liquid crystal panel 22 is not limited to the four patterns. And any number of pixels of the liquid crystal panel 22 other than 6×6 pixels can be used. Practically, a low pass filter having any kind of characteristic can be realized by using the liquid crystal panel 22 of several hundreds of pixels×several hundreds of pixels and several tens of ON/OFF patterns.

Next, the ON/OFF control of the liquid crystal panel 22 using the above-mentioned ON/OFF patterns is described below with reference to the flowchart in FIG. 11.

The exposing operation is started (S11 in FIG. 11), and the liquid crystal panel 22 is driven in the ON/OFF pattern (a) for time t0≤t<t1 (S12).

If the time t has reached t1 from the start of the exposure, the drive pattern of the liquid crystal panel 22 is switched to the ON/OFF pattern (b) (S13). Then, the liquid crystal panel 22 is driven in the ON/OFF pattern (b) for time t1≤t<t2 (S14).

If the time t has reached t2 from the start of the exposure, the drive pattern of the liquid crystal panel 22 is switched to the ON/OFF pattern (c) (S15). Then, the liquid crystal panel 22 is driven in the ON/OFF pattern (c) for time t2≤t<t3 (S16).

If the time t has reached t3 from the start of the exposure, the drive pattern of the liquid crystal panel 22 is switched to the ON/OFF pattern (d) (S17). Then, the liquid crystal panel 22 is driven in the ON/OFF pattern (d) for time t3≤t<t4 (S18). If the time t has reached t4 from the start of the exposure, the exposing operation terminates (S19).

By the above-mentioned ON/OFF control, the characteristic illustrated in FIG. 10 is obtained as the accumulated ON time of each pixel of the liquid crystal panel 22. By the characteristic, the ON time of the central pixel of the liquid crystal panel 22 is the longest, and the ON time becomes shorter for a farther pixel from the central pixel.

By performing the ON/OFF control of the liquid crystal panel 22 arranged at the aperture of the iris so that it indicates the ON time ratio characteristic as illustrated in FIG. 10, the luminous flux reflected from each point of the object to be shot 27 can be assigned to the characteristic of the Gaussian distribution when the luminous flux passes through the liquid crystal panel 22. As a result, as illustrated in FIG. 12, the characteristic by which the exposure energy of the central pixel is the largest and the exposure energy of the peripheral pixels gradually decreases at any target point of the image sensor 25, that is, the characteristic of the Gaussian distribution is obtained. Since such an exposure energy distribution can be obtained for each pixel of the image sensor 25, the low pass filter process of the Gaussian distribution can be optically performed on the incident light of the image sensor 25.

In the above-mentioned embodiment, the transmittance characteristic of light is substantially changed by controlling the ON time and the OFF time of each pixel of the liquid crystal panel 22, but the transmittance can also be directly changed by the gray scale control.

FIG. 13 illustrates a drive state of the liquid crystal panel 22 when the gray scale control is performed. An arbitrary low pass filter characteristic can be realized as in the ON/OFF control by enhancing the transmittance by increasing the gray scale of the central pixel while decreasing the transmittance by decreasing the gray scale of the peripheral pixels.

Figure 15:
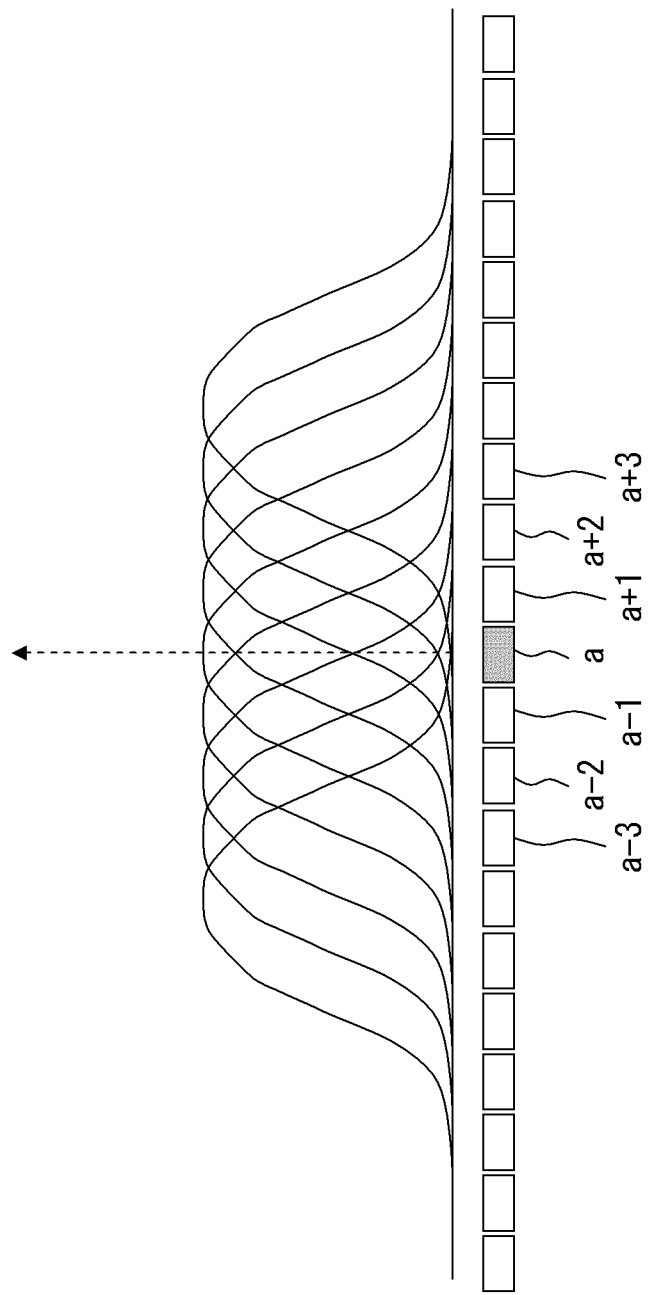
FIG. 15 illustrates exposure energy distributions of an arbitrary pixel string on an image sensor.

The above-mentioned operations according to the first through third embodiments are described below with reference to FIGS. 14 and 15. The imaging apparatus 31 for reading information having the image-side telecentric optical system illustrated in FIG. 8 is described as an example.

As illustrated in FIG. 14A, the light reflected by the point A of the object to be shot 27 spreads and enters the lenses 32 and 33, and the optical path is limited by the iris unit 22a of the liquid crystal panel 22. Since the ON time and the OFF time of the liquid crystal panel 22 are controlled to have the exposure energy distribution characteristic of the Gaussian distribution, the light is reflected by the point A, passes through the filter unit 22b of the liquid crystal panel 22, and indicates the highest exposure energy at the center of the luminous flux and decreases the exposure energy gradually towards the periphery. The light passes through the liquid crystal panel 22 and is converted into light parallel to the optical axis by the lenses 34 and 35, forms an image on the imaging surface 26, and spreads within a predetermined range (for example, the range of a radius of a 10-pixel length) on the light-receptive surface of the image sensor 25.

FIG. 14B illustrates the distribution of the exposure energy of incident light of each pixel of the image sensor 25. For example, the reflected light on the point A of the object to be shot 27 enters the corresponding pixel of the image sensor 25 and the peripheral pixels. The exposure energy of the reflected light at the point A indicates the Gaussian distribution, that is, the exposure energy of incident light of the central pixel on which the light of the center of the luminous flux enters is the largest while the exposure energy of incident light decreases for a farther pixel from the central pixel.

For the reflected light at the point next to the point A of the object to be shot 27, the exposure energy of incident light of the pixel next to the corresponding pixel to the point A of the object to be shot 27 is the largest, and the pixel farther from this pixel has a decreasing exposure energy, thus the exposure energy distribution also indicates the Gaussian distribution. Similarly, the exposure energy of incident light on each pixel of the image sensor 25 indicates the Gaussian distribution as illustrated in FIG. 14B. For simple explanation, FIG. 15 illustrates an arbitrary pixel string extracted from the distribution.

The light from the point A of the object to be shot 27 enters the corresponding pixel a of the image sensor 25 and a plurality of adjacent pixels a+1, a−1, a+2, a−2, . . . in the exposure energy distribution determined by ON/OFF controlling or gray scale controlling of the liquid crystal panel 22. Simultaneously, a part of the incident light centering on the pixel a+1, a−1, a+2, a−2, or other adjacent pixels also enters the pixel a. Thus, an optical convolutional operation is performed, which indicates that the low pass filter operation process that had been performed by the convolutional operation on the output signal of the image sensor 25 is optically replaced.

As described above, since the exposure energy distribution of the light from each point of the object to be shot 27 is controlled by the ON time and the OFF time or controlled by gray scale of each pixel of the liquid crystal panel 22 and enters the imaging sensor 25, the low pass filter process can be optically performed on the light incident on the image sensor 25. The predetermined range in which the light incident on the image sensor 25 spreads is not limited to the range of the diameter having a 3-pixel length.

According to the imaging apparatuses 21, 31, and 41 for reading information, the low pass filter process can be optically performed on the light from the object to be shot 27. Therefore, since it is not necessary to perform the low pass filter operation on the image signal of the image sensor 25, the processing time of the image processing can be shortened. In addition, a low pass filter having any characteristic can be realized by changing the ON time and the OFF time or gray scale of each pixel of the liquid crystal panel 22.

In the explanation above, the accumulated ON time distribution of the liquid crystal panel 22 or the transmittance distribution by controlling gray scale of the liquid crystal panel 22 is defined as a Gaussian distribution for simple explanation, and the resultant exposure energy distribution of a point image on the image sensor 25 is also defined as a Gaussian distribution. However, since a basic optical system itself commonly has not a flat power distribution but a specific light power distribution, these two distributions do not necessarily match each other. Therefore, to correctly set the exposure energy distribution on the image sensor 25 as the Gaussian distribution, it is necessary to adjust in advance the accumulated ON time distribution or the transmittance distribution of the liquid crystal panel 22 so that the specific distribution of the basic optical system can be offset. It is described below in detail with reference to FIGS. 16A and 16B.

FIG. 16A illustrates a configuration of the 6×6 pixel liquid crystal panel 22. FIG. 16B illustrates the accumulated ON time of each pixel of the liquid crystal panel 22 (the ratio of the ON time to the total exposure time) and the exposure energy distribution of the target pixel of the image sensor 25 and its peripheral pixels.

The liquid crystal panel 22 can have, for example, the iris unit 22a for limiting the incident range of the light by the pixels at four corner portions, and the filter unit 22b for controlling ON/OFF pattern of the pixels at the central portion.

The vertical axis in FIG. 16B indicates the ratio of the ON time to the total exposure time of each pixel of the liquid crystal panel 22 and the exposure energy distribution around the target pixel of the image sensor 25. The horizontal axis indicates the distance r (mm) from the center of the liquid crystal panel 22 and the distance (number of pixels) from the center of the target pixel of the image sensor 25.

The graph by the solid line in FIG. 16B indicates that the ratio of the accumulated ON time varies with the distance from the center of the liquid crystal panel 22. In the example in FIG. 16B, the ON time of the central pixel of the liquid crystal panel 22 is the longest, and the ON time of a farther pixel from the central pixel is shorter.

The graph by the dotted line in FIG. 16B indicates the exposure energy distribution of the point A' defined in FIG. 7 as the center of the luminous flux on the image sensor 25 (hereinafter simply called point A'), and its peripheral pixels when there is no liquid crystal panel 22 (or all pixels of the filter unit 22b of the liquid crystal panel 22 are ON) and the liquid crystal panel 22 is inserted into the aperture of the iris, and each pixel of the liquid crystal panel 22 is duty-controlled (ON/OFF controlled).

The dotted line in FIG. 16B (without a liquid crystal panel) indicates the energy distribution of the target pixel of the image sensor 25 when there is no liquid crystal panel 22 at the aperture of the iris in the out-of-focus state with the imaging surface 26 shifted in front of (or behind) the light-receptive surface of the image sensor 25. In this case, since the light whose incident range is limited by the iris enters the image sensor 25 as is, the exposure energy distribution of the pixels in a predetermined range centering on the target pixel (pixel at the point A') is trapezoidal. However, since the power of collected light by lens is generally smaller (darker) at the periphery than in the center of the lens, the distribution is not completely trapezoidal, but the power of light decreases as the distance r indicated by the dotted line in FIG. 16B increases (although the low pass filter effect can be obtained as is, it is limited to the low pass filter of a trapezoidal characteristic).

On the other hand, the dotted line in FIG. 16B (with a liquid crystal panel) indicates the exposure energy distribution of the target pixel of the image sensor 25 and its peripheral pixels when the ON time and the OFF time of each pixel of the liquid crystal panel 22 arranged at the aperture of the iris are controlled in the out-of-focus state with the imaging surface 26 shifted in front of (or behind) the light-receptive surface of the image sensor 25.

Since the output of the image sensor 25 is proportional to the product of the power of light incident on each pixel and the exposure time, for example, the exposure energy distribution at the point A' (with a liquid crystal panel) indicated by the dotted line in FIG. 16B can be obtained by controlling the ON time of each pixel of the liquid crystal panel 22.

When the low pass filter process characteristic to be performed on the output image of the image sensor 25 is the same as the dotted line in FIG. 16B (with a liquid crystal panel), the result obtained by dividing the target exposure energy distribution at the point A' (with a liquid crystal panel) by the exposure energy distribution at the point A' (without a liquid crystal panel) can express the characteristic of the ON time of each pixel of the liquid crystal panel 22. If the ON time of each pixel of the liquid crystal panel 22 indicated by the solid line in FIG. 16B is appropriately determined, then the exposure energy distribution around the target pixel of the image sensor 25 can be defined as an arbitrary distribution, for example, the Gaussian distribution.

Therefore, by controlling the ON time and the OFF time of each pixel of the liquid crystal panel 22, any low pass filter process can be optically performed on the light incident on the image sensor 25.

Figure 17:
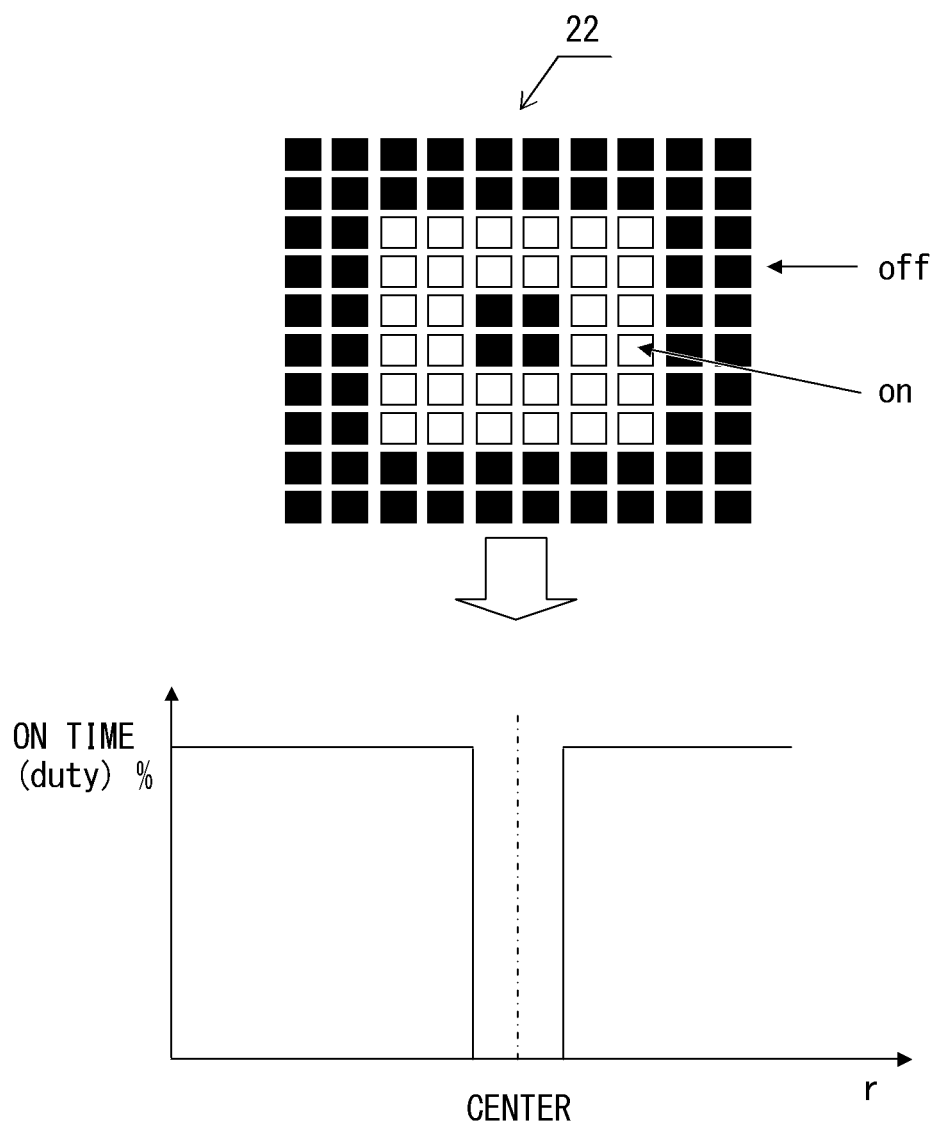
FIG. 17 is an explanatory view of a driving method of a liquid crystal panel according to the fourth embodiment.

FIG. 17 is an explanatory view of a driving method of the liquid crystal panel 22 according to the fourth embodiment. In the fourth embodiment, a singular point removal filter is realized with a specific pixel of the liquid crystal panel 22 in the OFF state.

FIG. 17 is an example of driving the liquid crystal panel 22 configured by 10×10 pixels. The light passing through the four central pixels of the liquid crystal panel 22 enters one central pixel of the image sensor 25. In this case, the four central pixels of the liquid crystal panel 22 are constantly placed in the OFF state, all pixels except the four central pixels in the 6×6 central pixels are placed in the ON state, and all peripheral pixels are placed in the OFF state.

FIG. 18 illustrates the exposure energy distribution on the image sensor 25 when the liquid crystal panel 22 is driven as described above.

By placing the four central pixels of the liquid crystal panel 22 in the OFF state and their peripheral pixels in the ON state, the exposure energy distribution on the central pixel a of the image sensor 25 can be set as 0%, and the exposure energy distribution on its peripheral pixels can be set as 100%. The output of the image sensor 25 in this case is obtained without the image in the position of the central pixel a, and the liquid crystal panel 22 functions as a singular point removal filter for removing noise on a specific portion of an image.

FIG. 19 illustrates an operation matrix of a singular point removal filter. To perform a process of a singular point removal filter on an output signal of the image sensor 25 in the conventional technique, it is necessary to perform the operation used in the operation matrix as illustrated in FIG. 19 on the central pixel a and its peripheral pixels, and a long time is taken to perform the operating process.

In the above-mentioned fourth embodiment, any singular point removal filter can be realized by placing a specific pixel of the liquid crystal panel 22 in the OFF state and its peripheral pixels in the ON state.

The singular point removal filter can shorten the operating time of image processing because the process is optically performed on the light incident to the liquid crystal panel 22, and no singular point removal filter operation is required.

In the above-mentioned embodiment, the processing time of image processing can be shortened in the imaging apparatus for reading information, and a desired low pass filter process can be optically performed on an image. In addition, since the processing time of image processing can be shortened, for example, the cost of the apparatus can be reduced by using a less expensive CPU of a relatively low processing speed.

The present invention is not limited to the above-mentioned embodiments, but can also be configured as listed below.

(1) Although the low pass filter process with a Gaussian distribution characteristic is performed in the embodiments above, the present invention can also be applied to a case where a low pass filter characteristic other than the Gaussian distribution is used. An element other than the transmissive liquid crystal device can be used as a transmissive spatial light modulator.

(2) The present invention can be applied not only to an image-side telecentric optical system, but also to an optical system configured by a plurality of lenses.

What is claimed is:

1. An imaging apparatus for reading information, comprising:
   an image sensor obtaining an image of an object;
   a lens system including a single lens or a plurality of lenses, the lens system receiving light from an object and guiding the light to the image sensor while focusing;
   an iris limiting an incident range of light from each of points on the object;
   a transmissive spatial light modulator arranged at an opening of the iris provided in the iris and assigning a transmittance characteristic varying with a position to each of incident light whose incident range is limited by the iris; and
   a control unit controlling the transmittance characteristic of the transmissive spatial light modulator;
   wherein
   by adjusting a distance between the lens system and the image sensor so that a focus position of the lens system can be set in front of or behind a light-receptive surface of the image sensor, each of the incident light spreads within a predetermined range on the light-receptive surface, and by assigning the transmittance characteristic varying with a position to each of the incident light by the transmissive spatial light modulator, identical intensity distributions of each of the incident light overlap one another, and as a result a desirable low-pass filter is optically implemented on the image.

2. The imaging apparatus for reading information according to claim 1, wherein:
   the transmissive spatial light modulator is a transmissive liquid crystal device; and
   the control unit controls an ON time in which each pixel of the transmissive liquid crystal device passes light and an OFF time in which light is not passed so that a exposure energy distribution of the light passing through a filter unit of the transmissive liquid crystal device can be a low pass filter characteristic.

3. The imaging apparatus for reading information according to claim 1, wherein:
   the transmissive spatial light modulator is a transmissive liquid crystal device; and
   the control unit controls a gray scale of each pixel of the transmissive liquid crystal device so that a transmittance characteristic of a filter unit of the transmissive liquid crystal device can be a low pass filter characteristic.

4. The imaging apparatus for reading information according to claim 1, wherein
   the distance between the lens and the image sensor is adjusted so that spread of an image on the light-receptive surface of the image sensor when the image forming position is before or behind of the light-receptive surface of the image sensor can be a length of three pixels or more in diameter.

5. The imaging apparatus for reading information according to claim 1, wherein
   the exposure energy distribution of the light passing through the transmissive spatial light modulator is a Gaussian distribution.

6. The imaging apparatus for reading information according to claim 1, wherein
   the transmissive spatial light modulator is arranged between the object to be shot and the lens.

7. The imaging apparatus for reading information according to claim 1, wherein
   the lens is an optical system configured by a plurality of lenses, and the transmissive spatial light modulator is arranged between the plurality of lenses.

* * * * *